United States Patent

Merryman

[15] 3,648,097

[45] Mar. 7, 1972

[54] DIGITAL CATHODE-RAY TUBE LINEARITY CORRECTOR

[72] Inventor: Jerry Dale Merryman, Houston, Tex.

[73] Assignee: Texas Instruments Incorporated, Dallas, Tex.

[22] Filed: Dec. 1, 1969

[21] Appl. No.: 881,251

[52] U.S. Cl. ............................................315/24, 315/27 GD
[51] Int. Cl. ............................................H01j 29/46
[58] Field of Search ............................................315/24, 27 GD

[56] References Cited

UNITED STATES PATENTS

| | | | |
|---|---|---|---|
| 3,341,735 | 9/1967 | Briggs | 315/27 |
| 3,435,278 | 3/1969 | Carlock et al. | 315/27 |
| 3,422,305 | 1/1969 | Infante | 315/27 |

OTHER PUBLICATIONS

R. E. Turnage, Jr., Compensating for 2 Types of CRT Distortion, 5/11/64, pg. 62–64

*Primary Examiner*—Benjamin A. Borchelt
*Assistant Examiner*—N. Moskowitz
*Attorney*—James O. Dixon, Andrew M. Hassell, Harold Levine, Mel Sharp, John E. Vandigriff, Henry T. Olsen, Michael A. Sileo, Jr. and Gary C. Honeycutt

[57] ABSTRACT

A system for correcting the signals transmitted to the deflection yokes of a cathode-ray tube employs digital means to produce an undistorted linear display while requiring a minimum of adjustments. Basically, the system utilizes digital circuitry to produce a correction factor from digital X- and Y-coordinate data supplied by a digital computer. This correction factor, which is equivalent to the sum of the squares of the X- and Y-coordinate data, is converted into an analog signal, along with the coordinate data, by digital to analog converters. The analog correction signal is multiplied by and then added to the analog coordinate signals, thereby producing the corrected deflection signals for an undistorted linear display on the essentially flat face of the tube. An analog correction signal may also be utilized to correct the focus of the electron beam on the tube face.

10 Claims, 13 Drawing Figures

INVENTOR
*Jerry Dale Merryman*

BY [signature]
ATTORNEY

DIGITAL CATHODE-RAY TUBE LINEARITY CORRECTOR

This invention relates generally to linearity correctors of signals transmitted to the deflection yokes of a cathode-ray tube, and more particularly, to a highly accurate digital system for correcting the deflection signals, whereby undistorted linear displays are produced on the flat face of a cathode-ray tube with a minimum of adjustments.

In different types of cathode-ray tube display apparatus, it is usually desired to deflect a beam of electrons or other electrical particles across the face of the tube. If the electron beam is electromagnetically or electrostatically deflected and the center of curvature of the face of the tube coincides with the center of deflection of the beam, the various dimensions of a linear display pattern are undistorted. If, however, these centers do not coincide, the display becomes nonlinear; such nonlinearity is termed pincushion distortion. The greater the departure of the curvature of the face of the tube from the center of deflection, the greater the distortion. On a virtually flat faced tube, for example, this type of distortion becomes particularly large as the electron beam is deflected further from the center of the face.

Although not necessarily limited thereto, this invention is particularly useful in the generation of photomasks for integrated circuit fabrication. As the state of the art of integrated circuit techniques advances, more complex circuitry is formed on a single wafer. With present techniques of manufacturing one or more photomasks are required in the fabrication process, and as the circuitry becomes more complex, the photomasks required for these circuits likewise become more complex. In an attempt to simplify the production of photomasks, digital computers have recently been employed.

A number of different systems have been proposed to operate in conjunction with a digital computer in the preparation of photomasks, such as a system incorporating a step-and-repeat camera or one incorporating an X-Y plotting table, but the mechanical apparatus involved in these systems limits the speed with which the mask can be reproduced from a computer program. A much more sophisticated system for producing a photomask employs a cathode-ray tube coupled to the output of the computer. The problem with presently available cathode-ray tube systems is that the electron beam, which is deflected through an arc against the virtually flat face of the tube is subject to pincushion distortion.

Several attempts have been made to solve this problem, including shaping the face of the tube, and using a shaped fiber optic plate. Due to the complexity of both of these methods, however, the costs involved in such solutions are exorbitant. Also, phosphor deposition on both these tubes is difficult, thus degrading tube quality. Possibly of more significance, the best known results of photomask production using either the shaped tube or the fiber optic tube have achieved a linear bit accuracy of only about 0.25 percent. This is at least one order of magnitude less than satisfactory for photomask production.

The most generally used method of correcting cathode-ray tube nonlinearity is by means of magnetic correction. The magnetic corrector actually modifies the electron beam displacement to present a linear display. Although it is possible to achieve a linear bit accuracy on the order of 0.2 percent using magnetic correction, there is a marked reduction in display resolution.

Other methods, such as complex analog circuits have also been utilized. These circuits, often requiring a large number of resistor-diode networks, are not stable under varying conditions of temperature, noise or vibrations. Although the more sophisticated of these analog systems can be adjusted to an accuracy which is satisfactory for photomask production, the adjustments necessary are often upwards of 200 and the systems require readjustment every time there is a slight change of environmental conditions.

To linearize the display obtained with a cathode-ray tube, it is therefore an object of this invention to provide a highly accurate signal corrector for linearizing such display to the bit accuracy of a control digital computer.

Another object of this invention is to provide a signal corrector wherein stable and repeatable linear cathode-ray tube displays are produced from a digital computer output with a minimum of adjustments.

A further object of this invention is to provide a digital cathode-ray tube linearity corrector.

In accordance with the invention, there is provided a cathode-ray tube display apparatus, the deflection yokes of which have an approximately linear relationship with respect to the deflection input signals transmitted to it. Between the display apparatus input terminals and a digital computer which provides the deflection signal coordinate data in binary form, digital circuitry is interconnected which provides a correction factor to overcome the pincushion distortion. This correction factor, which is equivalent to the binary sum of the squares of a coordinate on a first reference axis or X-coordinate and a coordinate on a second axis mutually perpendicular to said first axis or Y-coordinate, is converted into an analog signal, along with the coordinate data, by digital-to-analog converters. The analog correction signal is multiplied by and then added to the analog coordinate signals, thereby producing the corrected deflection signals which are transmitted to the display apparatus to provide an undistorted linear display on the essentially flat face of the cathode-ray tube. Two adjustment controls are provided to compensate for any distortion created by the digital-to-analog converters and analog amplifiers necessary to convert the digital deflection signal coordinate data into deflection signals compatible with the deflection yokes of the cathode-ray tube display apparatus. In addition, two more controls may be provided to center the display on the tube. An addition control for the focus correcting feature of an embodiment of this invention may also be added when such feature is desired.

Other objects and advantages of the invention will be apparent from the detailed description and claims and from the accompanying drawings illustrative of the invention wherein:

Figure 7B:
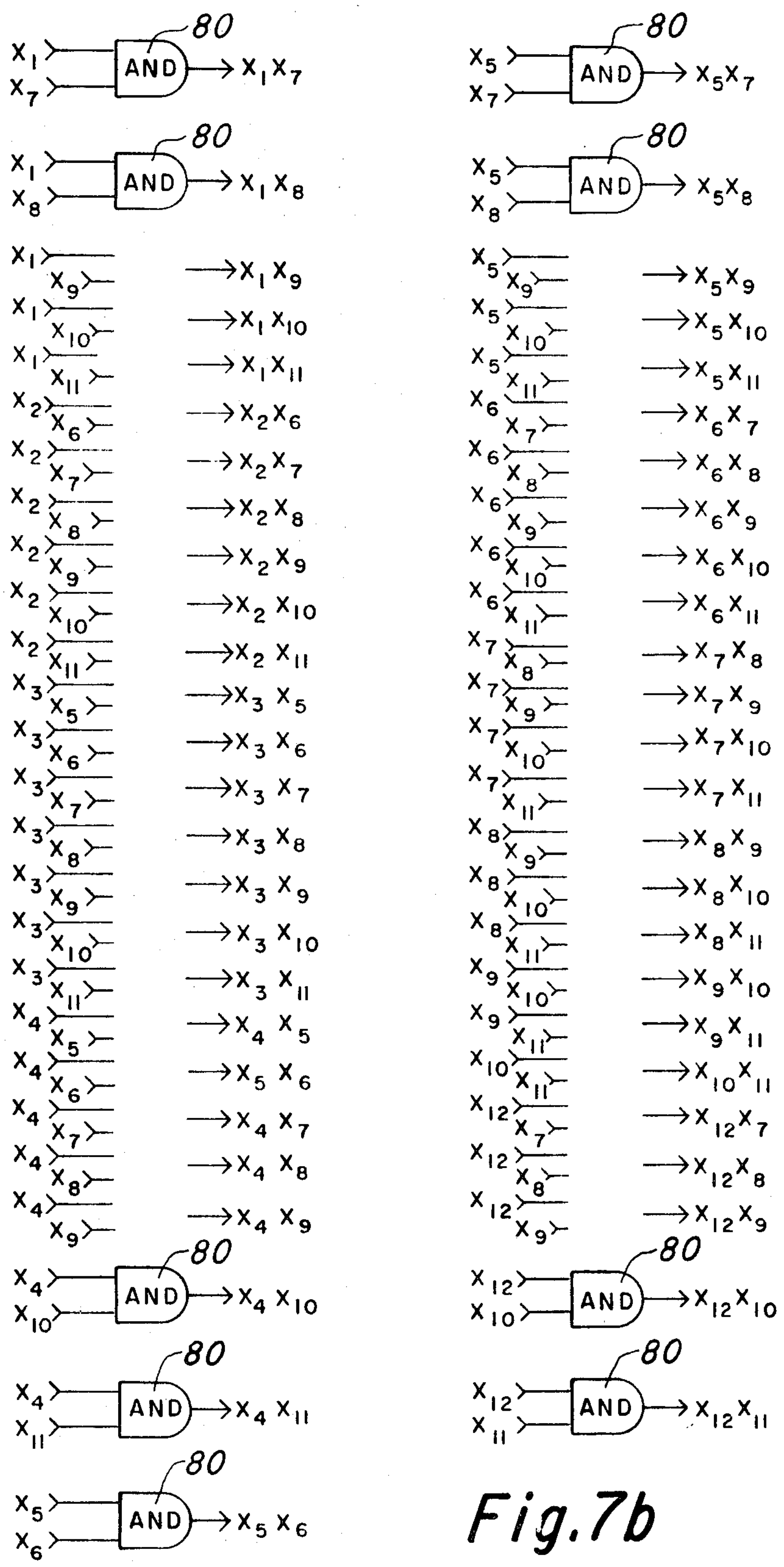
Figure 7C:
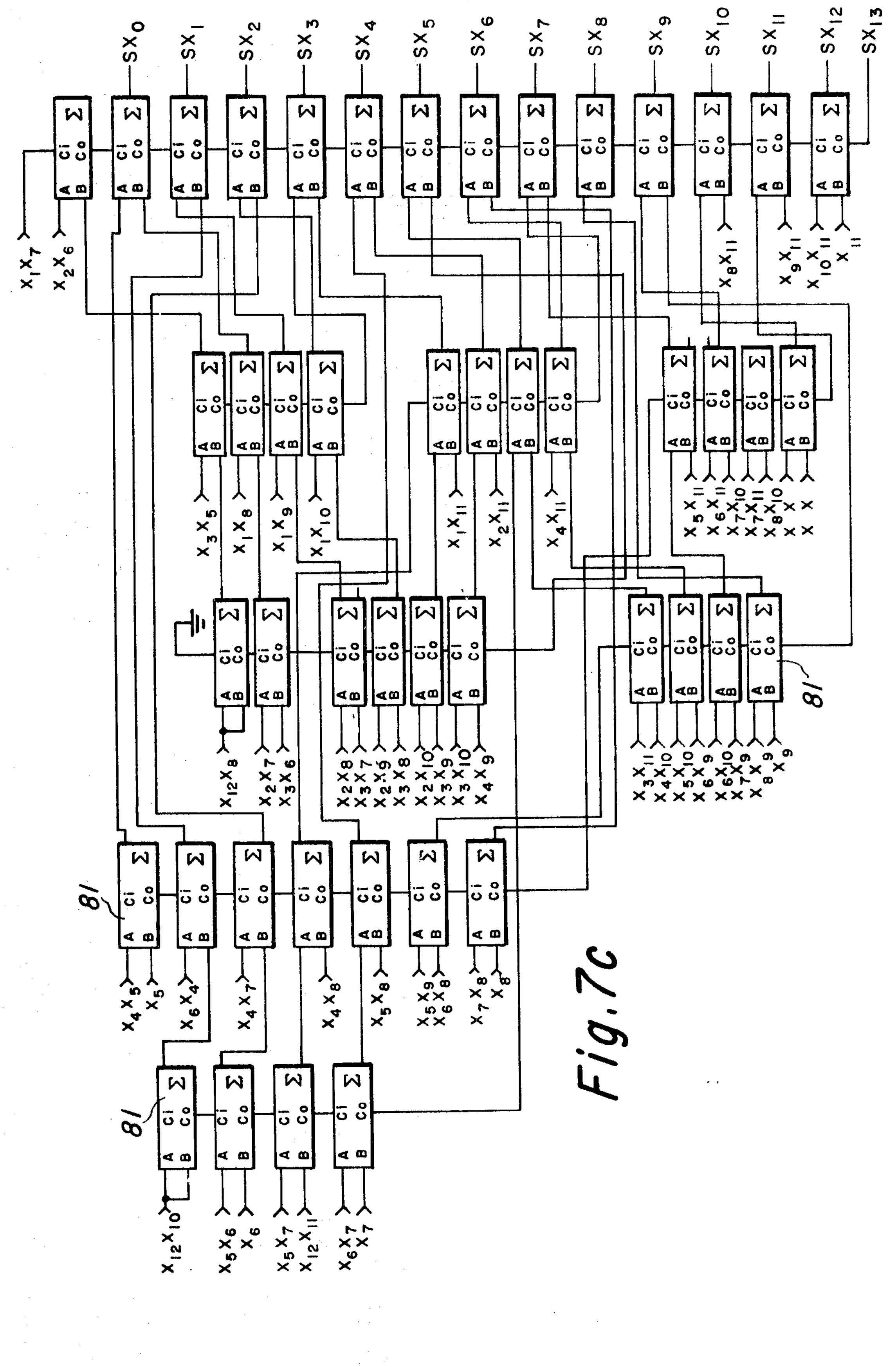
Figures 6, 7A:
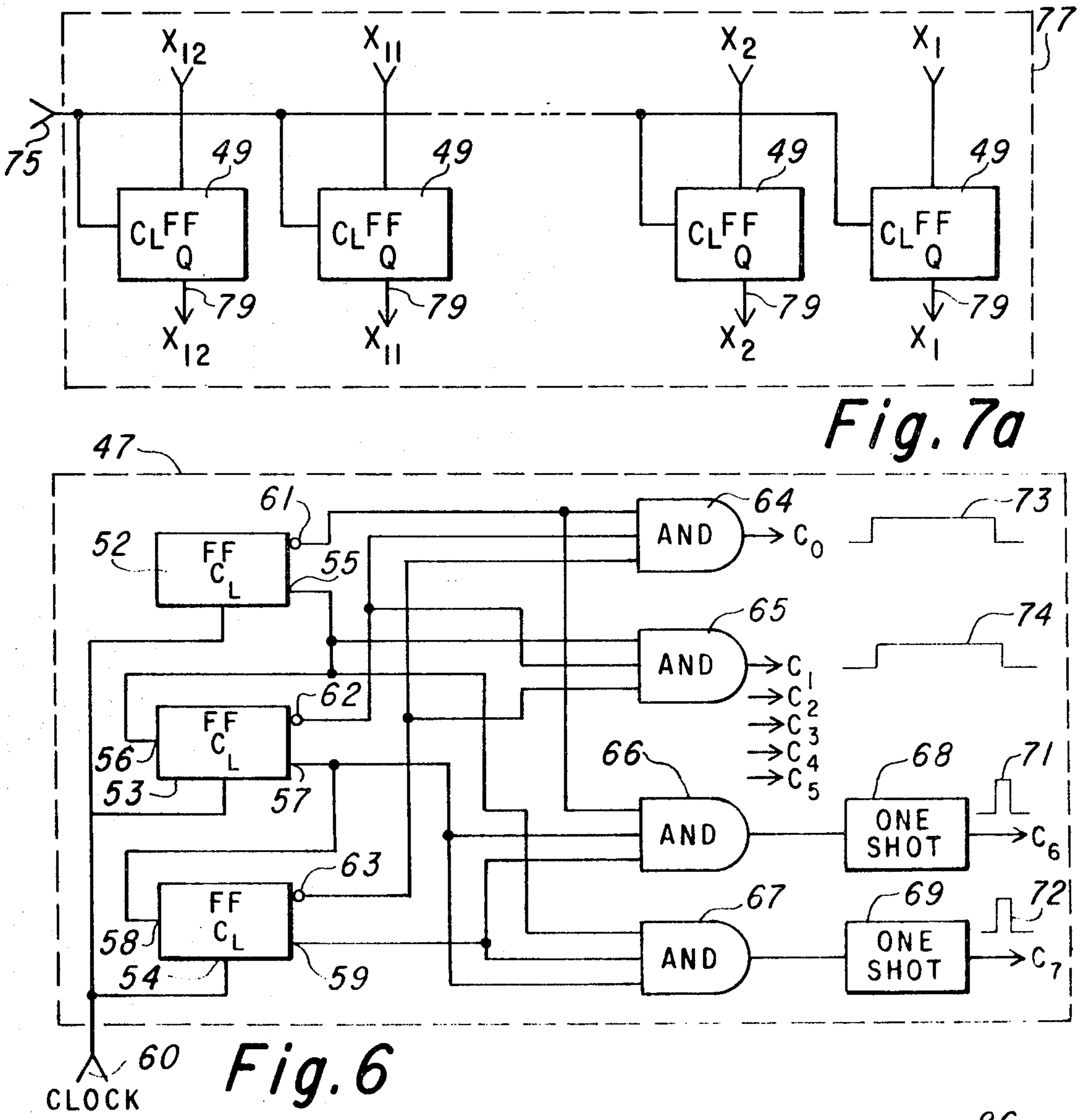
FIG. 6 is a logic diagram of a timing control circuit of an embodiment of the invention.
Figure 9:
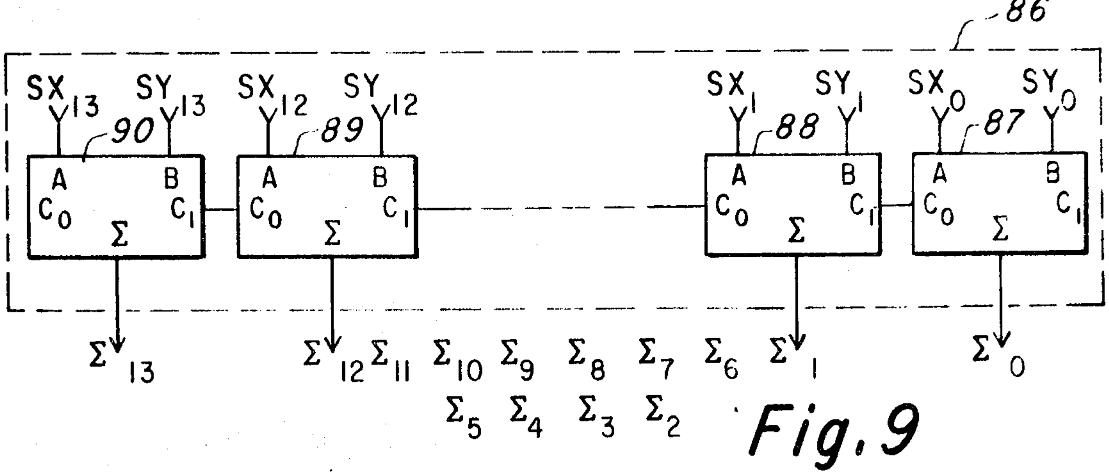
Figure 8:
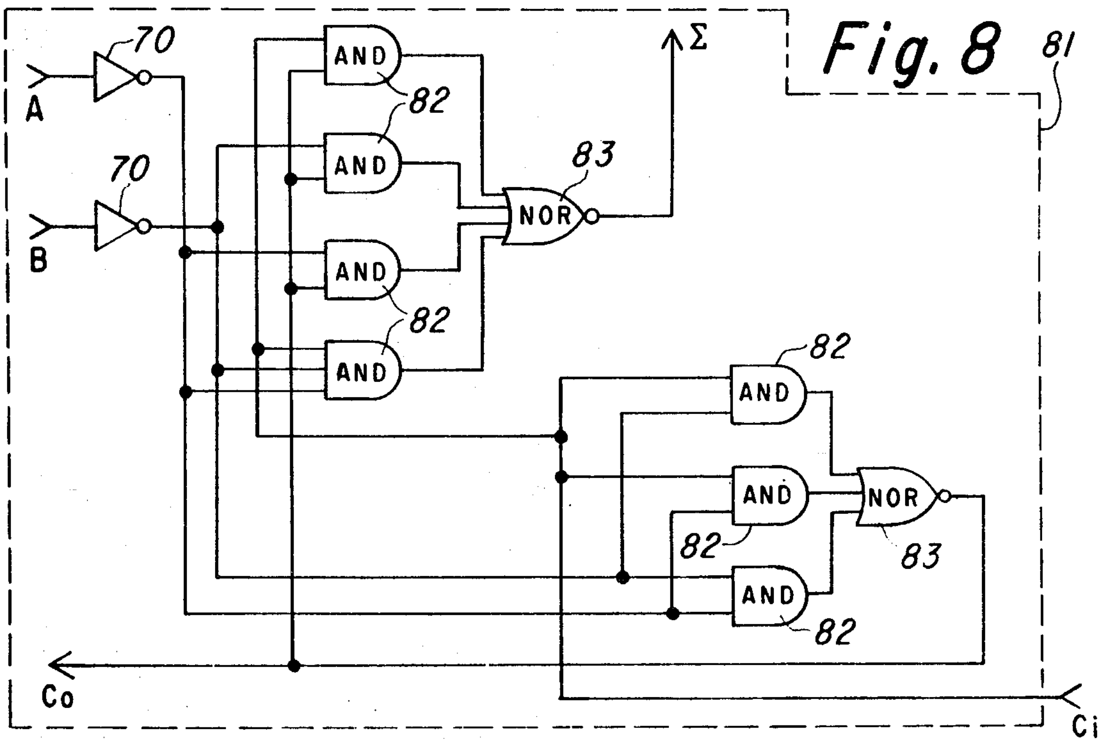
Figure 10:
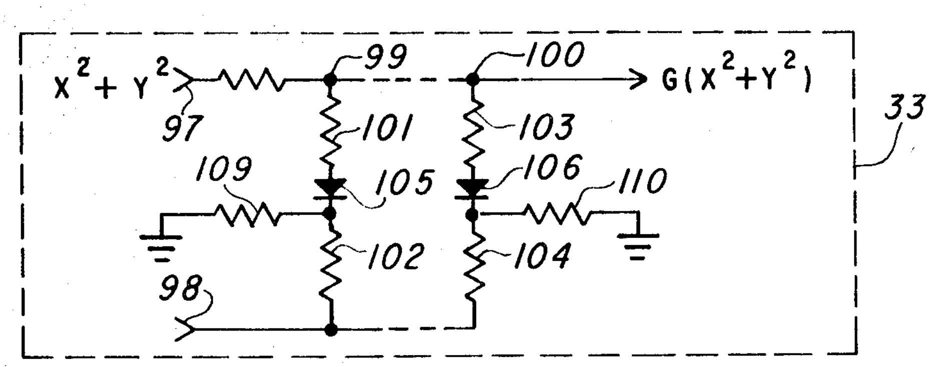
Figure 11:
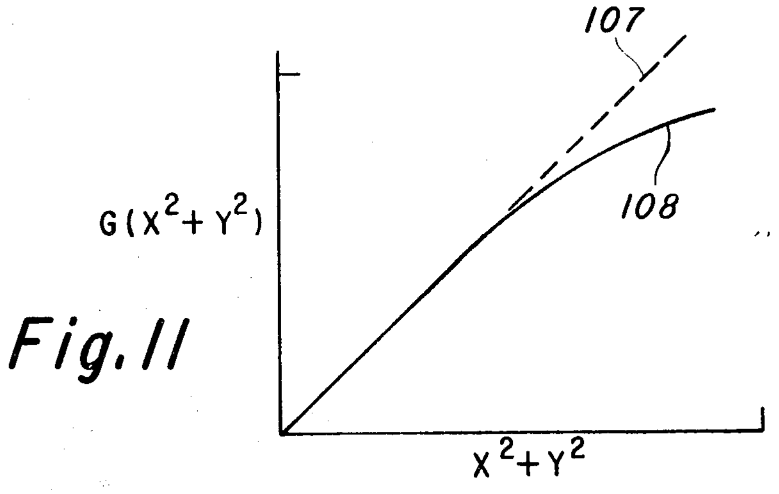

FIGS. 7*a*, 7*b*, and 7*c* are sections of a detailed logic diagram of the binary digital squarer circuit of a preferred embodiment of the invention;

FIG. 8 is a detailed logic diagram of a binary single-bit adder employed in the digital correction circuit of a preferred embodiment of the invention;

FIG. 9 is a logic diagram of the adder circuit of an embodiment of the invention;

FIG. 10 is a circuit diagram of a correcting circuit feature of an embodiment of the present invention to compensate for distortion inherently created by the deflection yokes of the cathode-ray tube display apparatus; and FIG. 11 is an illustration of the compensating effect of the correcting circuit feature to compensate for distortion inherently created by the deflection yokes of the cathode-ray tube display apparatus.

Figure 1:
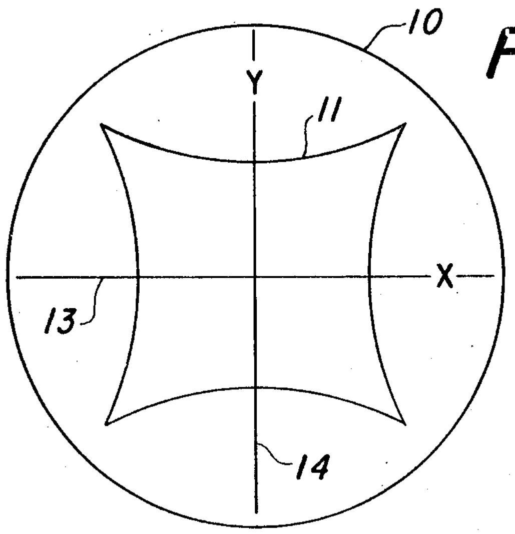
FIG. 1 is an illustration of an uncorrected rectangular display as it appears on the face of the cathode-ray tube and the effect of pincushion distortion.

Referring to the drawings, FIG. 1 illustrates the effect of pincushion distortion on a rectangular display 11 as it appears on the essentially flat face 10 of a cathode-ray tube. The distortion occurs because the center of deflection of the beam of electrons or other electrical particles forming the display 11 does not coincide with the center of curvature of the flat face of the tube.

Figure 2:
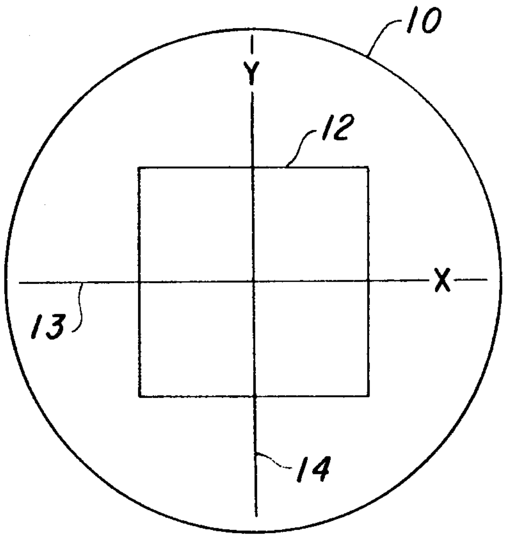
FIG. 2 is an illustration of the same rectangular display after it has been corrected by the use of the subject invention.

If the display signals had been properly corrected before transmitting them to the deflection yokes coupled to the cathode-ray tube (not shown in this figure), the resultant rectangular display 12 would appear undistorted as illustrated in FIG. 2.

Figure 3:
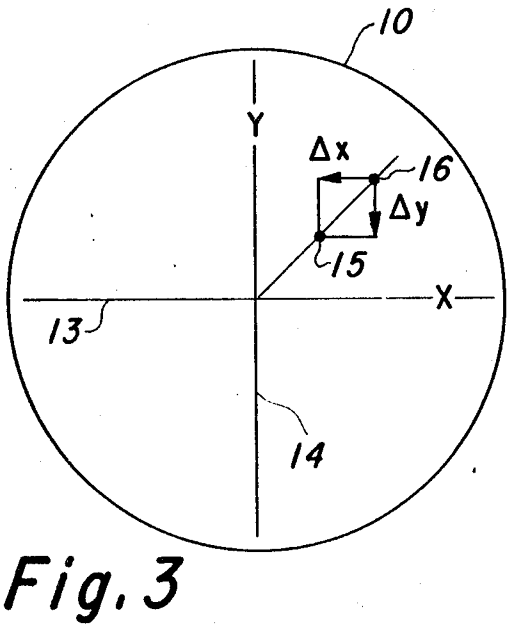
FIG. 3 is an illustration of the correction signal provided by the subject invention which is a function of both the X- and Y-deflection signals.

Pincushion distortion is a function of both a coordinate on a first reference axis 13 or X-coordinate and a coordinate on a second mutually perpendicular axis 14 or Y-coordinate. If the rectangular coordinates of a point 15 of a particular display as illustrated in FIG. 3 is $(x, y)$, the effect of the pincushion distortion would cause a displacement of the point 15 and it would appear on the face 10 of the tube as point 16 for example. In order to have the point 16 appear correctly on the face of the tube 10 an additional signal must be added to the X-coordinate to counterdisplace it $\Delta x$ and an additional signal must be added to the Y-coordinate to counterdisplace it $\Delta y$.

Figure 4:
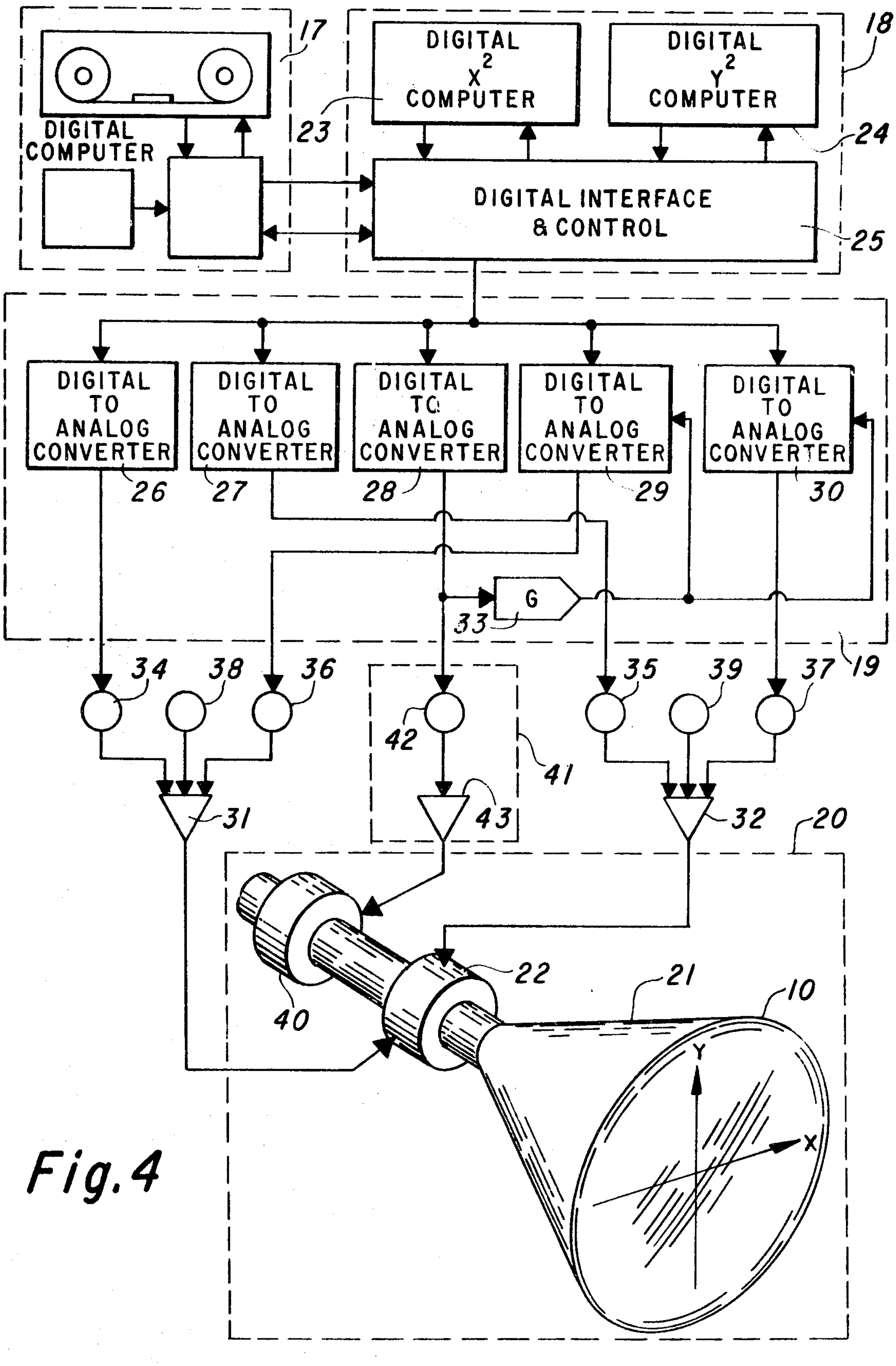
FIG. 4 is a block diagram of the subject invention.

The digital linearity correction system of the invention, illustrated in FIG. 4, provides corrected deflection signals which are transmitted to the analog display apparatus 20 of an embodiment of the system thereby performing the necessary counterdisplacements. Basically, the system employs digital circuitry 18 to produce a correction factor from the digital X- and Y-coordinate data supplied by a digital computer 17. This correction factor, which is equivalent to the sum of the squares of the X- and Y-coordinate data, is converted into an analog signal, along with the coordinate data by converter means 19. The analog correction signal is multiplied by and then added to the analog coordinate signals, thereby producing the corrected deflection signals for an undistorted linear display on the essentially flat face 10 of the cathode-ray tube 21 of an analog display apparatus utilized in an embodiment of the system. The corrected deflection signals are transmitted to deflection yokes 22 which magnetically or electrostatically deflect a beam of electrons or other electrical particles across the face 10 of the cathode-ray tube 21 to produce a linear display or the face. Four adjustment controls 34, 35, 36 and 37, such as variable resistors, are provided to adjust the correct signal strengths X, Y, ΔX and ΔY to the operational amplifiers 31 and 32 thereby providing deflection signals compatible with the deflection yokes 22 coupled to the cathode-ray tube display apparatus 20. In addition, two other controls 38 and 39 may be provided to center the display on the face 10 of the tube 21 and still another control 42 for adjustment of a focus correcting feature 41 may be added when such feature is desired.

The converter means utilizes five digital-to-analog converter channels 26, 27, 28, 29 and 30. The X-coordinate data, supplied by the digital computer 17, is sequentially transmitted by the digital circuitry 18 to the first and fourth channels 26 and 29, the Y-coordinate data is transmitted to the second and fifth channels 27 and 30, and a correction factor is transmitted to the third channel 28. The analog output of the third channel is coupled to the fourth and fifth channels 29 and 30 so that the analog output signals from these channels (29 and 30) are equivalent to the analog X- and Y-coordinate data times the correction factor. These signals are then added to the output signals from the first and second channels to form the corrected deflection signal transmitted to the analog display apparatus 20.

Figure 5:
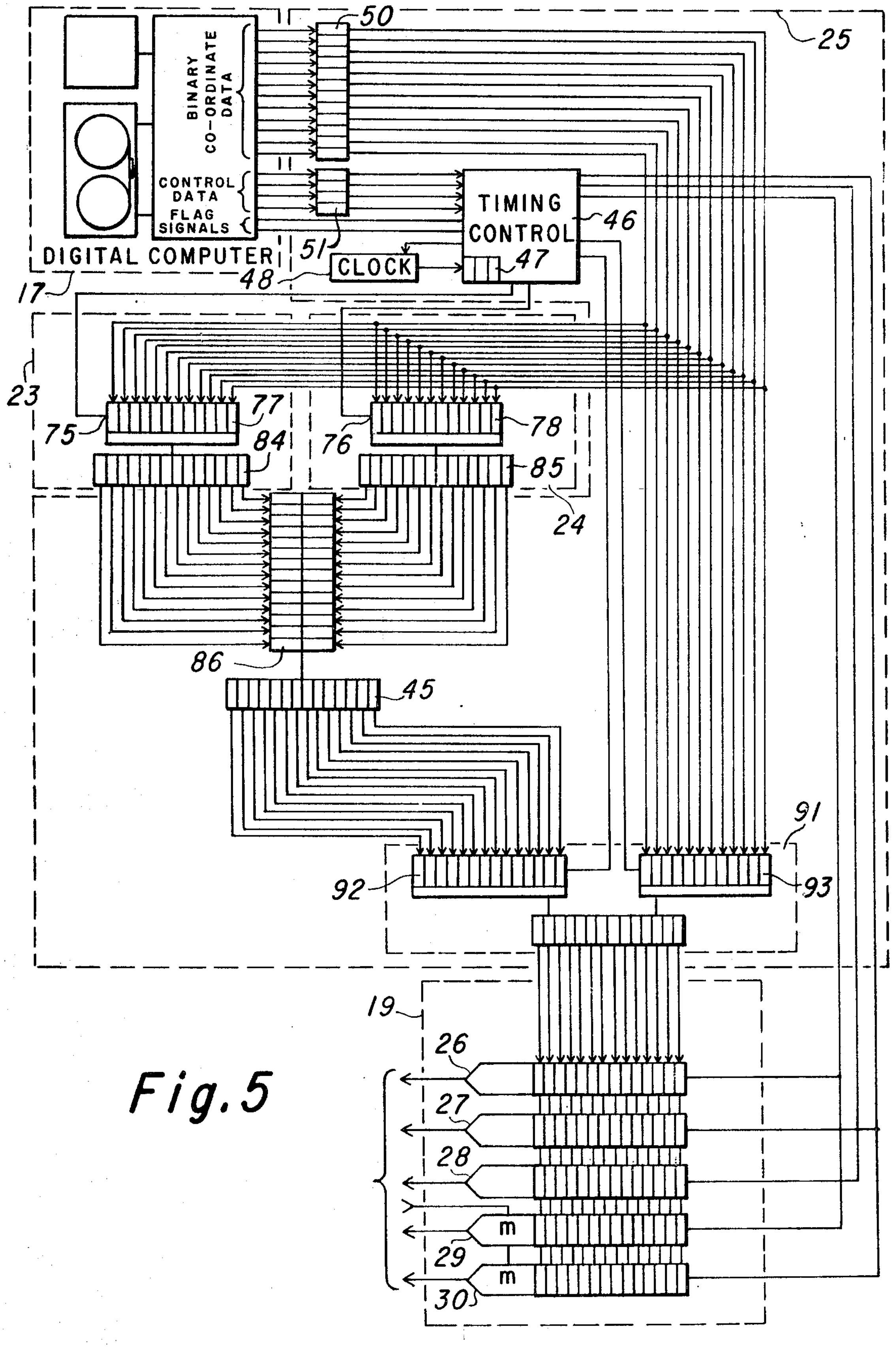
FIG. 5 is a detailed block diagram of the digital correction circuit of a preferred embodiment of the invention.

An embodiment of the digital circuit 18 which is basically comprised of an X-coordinate data squarer circuit 23, a Y-coordinate data squarer circuit 24 and a digital interface and control circuit 25 will now be described in detail. As illustrated in FIG. 5, a plurality of bits of digital information 50 comprising the coordinate data in binary form, is supplied by the digital computer 17. The number of bits is determined by the degree of accuracy the system is desired to operate at and the degree of accuracy of the other components of the system. Twelve bits have been selected by way of example only. Another plurality of bits of digital information 51 comprising control data in binary form is also supplied by the computer. Some of these bits of information 51, which are transmitted to a timing control circuit 46 determine whether the coordinate date is that of an X- or Y-coordinate and others may be utilized to direct the switching of the electron beam on or off.

The timing control 46 is essentially a pulse operated sequential counting circuit 47 which directs digital information in binary form to various components of the system at each pulse. The pulses are produced by clock means 48. A typical counter circuit 47 which may be employed for this purpose is illustrated in FIG. 6. Three bistable flip-flops 52, 53 and 54 are connected in series with the output 55 of the first flip-flop 52 connected to the input 56 of the second flip-flop 53 and the output 57 of the second flip-flop 53 connected to the input 58 of the third flip-flop 54. Complementary outputs 61, 62 and 63 are also provided by each of the flip-flops 52, 53 and 54 respectively. As a result, eight combinations of binary information (000, 001, 010, 011, 100, 101, 110 and 111) are transmitted to eight AND gates (four of which 64, 65, 66 and 67 are illustrated), whereby a logical "one" will sequentially appear at the output of each of the AND gates every eighth clock pulse introduced at the circuit input 60. Although an eight-counter circuit 47 has been described, additional operations may be included in the sequence by adding one or more flip-flops to the circuit.

Typical signals 73 and 74 such as illustrated at the outputs C0 and C1 of some of the AND-gates 64 and 65 are transmitted to other logic gate circuits of the system while the output signals of other AND-gates 66 and 67, for example, are transmitted to one shot multivibrators 68 and 69 respectively whereby clock pulses 71 and 72 are produced for the operation of other flip-flops employed in various registers of components in the system.

Referring back to FIG. 5, at some period during the sequence of the counting circuit 47, of the timing control 46, a pulse is transmitted either to the clock input (75 or 76) of an X-coordinate squarer circuit 23 or a Y-coordinate squarer circuit 24 depending on whether the control information 51 indicates that the coordinate data 50 supplied by the computer 17 is an X- or Y-coordinate and the coordinate will thereby be stored in either register 77 or 78.

The squarer employed in this invention is a circuit whose binary output is the square of its binary input. A binary square function is first simplified mathematically and then implemented by a simplified circuit. Since both the X-coordinate squarer circuit 23 and Y-coordinate squarer circuit 24 are virtually identical, only an embodiment of the X-coordinate squarer circuit, as illustrated in FIGS. *7a*, *7b* and *7c*, is herein described in detail.

FIG. *7a* illustrates the register circuit 77, which stores the binary data in bistable flip-flops 49 when a pulse is introduced at the clock input 75. The binary X-coordinate ($X_{12}X_{11}X_{10}X_9X_8XX_6X_5X_4X_3X_2X_1$) then remains at the outputs 79 until another pulse in the sequence is introduced at the clock input 75 and a next binary X-coordinate is switched into the register 77 to take its place.

Fifty-one pairs of the binary digits are then introduced into AND-gates 80 as illustrated in FIG. *7b* to form 51 combinations of the binary X-coordinate digits ($X_1X_7$, $X_1X_8$, $X_5X_7$, $X_5X_8 - X_4X_{10}$, $X_4X_{11}$, $X_5X_6$, $X_{12}X_{10}$ and $X_{12}X_{11}$).

As illustrated in FIG. *7c*, the combinations, and several of the individual binary digits are then introduced into the inputs (A and B) of binary adder circuits 81 which perform the actual implementation of the simplified square function. The output of the circuit is a 14-bit binary number ($SX_{13}SX_{12}SX_{11}SX_{10}SX_9X_8SX_7SX_6SX_5SX_4SX_3SX_2SX_1SX_0$).

A typical binary single-bit full-adder circuit 81, such as that employed in the binary coordinate squarer circuits described above, is illustrated in FIG. 8. Two binary bits, introduced at the inputs A and B, and a third binary bit carried from another adder circuit introduced at the carry input $Ci$, are logically summed. The one-bit logical sum appears at the Σ output and a carry bit appears at the carry output Co. Mathematically, $\Sigma = A\bar{B}\bar{C}i + \bar{A}B\bar{C}i + \bar{A}BCi + ABCi$ and $Co = AB\bar{C}i + ABCi - ABCi + ABCi$. This function is logically implemented by the NOT-gates 70 whose outputs are the logical complements of their inputs, AND-gates 82 which logically multiply the binary bits and NOR-gates 83 whose outputs are the complements of the logical sum of their inputs.

Referring again to FIG. 5, the 14-bit binary number $(SX_{13}SX_{12}X_{11}SX_{10}SX_9SX_8SX_7SX_6SX_5SX_4SX_3SX_2SX_1SX_0)$ at the output 84 of the binary X-coordinate squarer circuit 23 and a corresponding 14-bit number $(SY_{13}SY_{12}SY_{11}SY_{10}SY_9S Y_8SY_7SY_6SY_5SY_4SY_3SY_2SY_1SY_0)$ at the output 85 of the binary Y-coordinate squarer circuit 24 are logically summed in a 14-bit full-adder circuit 86.

The full-adder circuit 86 is illustrated in FIG. 9. Fourteen single-bit adders (such as the one described with reference to FIG. 8), of which only the first and second 87 and 88 and the 13th and 14th 89 and 90 are shown, are connected in series with the carry bit output C0 of each preceding single-bit adder connected to the carry input C*i* of the next single-bit adder. The first pair of bits $SX_0$ and $SY_0$ are thus summed in the first single-bit adder 87; $\Sigma_0$ appears at the output; and a first carry bit is transmitted to the second single-bit adder 88. The second single-bit adder sums this first carry bit and the second pair of bits $SX_1$ and $SX_2$; $\Sigma_1$ appears at its output. A second carry bit is then transmitted to the third single-bit adder and so forth, until a 14th bit $\Sigma_{13}$ appears at the output of the last single-bit adder 90. The 14-bit binary output $(\Sigma_{13}\Sigma_{12}\Sigma_{11}\Sigma_{10}\Sigma_9\Sigma_8 \Sigma_7\Sigma_6\Sigma_5\Sigma_4\Sigma_3\Sigma_2\Sigma_1\Sigma_0)$ which is the binary sum of the squares of the X- and Y-coordinate data, represents the correction factor in digital form.

Once again referring back to FIG. 5, the output 45 of the 14-bit binary full adder circuit 86 is transmitted to a selector 91 which, in turn, sequentially transmits either the correction factor or an X- or Y-coordinate to the digital-to-analog converter channels 19 depending upon control signals from the timing control 46. One simple method of implementing the selection function would be to utilized two register circuits 92 and 93 (similar to the one described with reference to FIG FIG. a), a first register 92 for the 14-bit sum and a second register 93 for the coordinate data. A pulse to the clock input of one of the two registers would place the binary number, introduced at its input, in the output of the register and thereby transmit the number to the digital-to-analog converter channels 19. That register could then be cleared, and a clock pulse to the other register would transmit the binary number at its input to the digital-to-analog converter channels 19.

Although the same binary number is transmitted to each of the five digital-to-analog converter channels 26, 27, 28, 29 and 30, the binary number is clocked only into some of these channels corresponding to control signals transmitted from the timing control 46. Thus, X-coordinate are clocked into the first and fourth channels 26 and 29, Y-coordinates are clocked into the second and fifth channels 27 and 30, and the binary correction factor is clocked into the third channel 28. In addition, the output of the third channel 28 is coupled to an analog input (*m*) of the fourth and fifth channels 29 and 30 whereby the analog correction factor $(X^2+Y^2)$ is multiplied by the X- and Y-coordinates to form X- and Y-analog correction factors respectively.

As illustrated in FIG. 4, the analog correction factors appearing at the outputs of the fourth 29 and fifth 30 channels of the digital-to-analog conversion means 19 are added to the outputs of the first 26 and second 27 channels by analog operational amplifiers 31 and 32 respectively, thereby forming the final corrected deflection signals which are transmitted to the deflection yokes 22 of the analog display apparatus 20.

The analog correction factor $(X^2+Y^2)$ is sufficient to correct the displacement created by the effect of pincushion distortion. Additional distortion, however, is caused by an inherent nonlinearity of the deflection yokes 22 utilized to deflect the electron beam across the face 10 of the cathode-ray tube 21. In order to compensate for this additional distortion, a breakpoint (G) circuit 33 is implemented in coupling the third digital-to-analog converter channel 28 to the fourth and fifth channels 29 and 30 as shown in FIG. 4.

A typical break-point circuit 33 is illustrated in FIG. 10. The analog correction factor $(X^2+Y^2)$ is transmitted to the circuit input 97. Several breakpoints, of which two are shown 99 and 100, drain off part of the input signal in accordance with a constant voltage applied at terminal 98. The amount of the input signal drained off is determined by the values of the resistors 101, 102, 103 and 104 and the constant voltage supply; hence, these values are selected in accordance with the characteristics of a particular deflection yoke. Diodes 105 and 106 act as switches, allowing part of the input signal to be drained off when the potential of the input signal applied through resistors 101 and 103 is greater than the voltage across resistors 109 and 110 and preventing the input signal from being increased when the potential of the input signal through resistors 101 and 103 is less than the voltage across resistors 109 and 110. The output signal then becomes $G(X^2+Y^{2})$.

The effect of the breakpoint circuit has been illustrated in FIG. 11 by plotting the output signal $G(X^2+Y^2)$ against the input signal $X^2+Y^2$. If a linear relationship existed between the input signal to the deflection yoke and the actual deflection, a linear relationship would exist between $G(X^2+Y^2)$ and $X^2+Y^2$ represented by curve 107. Actually, however, this linearity often does not exist and the breakpoint circuit is employed to compensate for this nonlinearity by reducing output signal strength as the input signal strength is increased. This compensation is represented by curve 108.

Another feature of an embodiment of the invention is a focusing corrector 41 as illustrated in FIG. 4. For the same reason that the curvature of the face 10 of the cathode-ray tube 21 causes pincushion distortion, it also causes the focus of the electron beam on the face 10 to be distorted and hence the display becomes out-of-focus. This distortion in focus may be corrected, however, by coupling the output of the third digital-to-analog converter channel to a focusing means 40 on the cathode-ray tube through an operational amplifier 43 and control 42. The analog correction factor is thereby utilized to correct the focus as well as the effect of pincushion distortion.

The embodiments of the invention described above, employ specific digital circuitry to produce a correction factor from digital X- and Y-coordinate data, whereby corrected deflection signals are transmitted to an analog display apparatus. It has been recognized, however, that a general-purpose digital computer may be regarded as a store room of electrical parts and when properly programmed, becomes a special-purpose digital computer or specific electrical circuit. Therefore, other embodiments of the invention will employ a properly programmed general-purpose digital computer to replace some or all of the specific digital circuitry of the above-described embodiments.

The description of specific embodiments contained herein are merely illustrative of the principles underlying the inventive concept. Various modifications of the disclosed embodiments, as well as other embodiments of the invention, will be apparent to persons skilled in the art.

I claim:

1. In an analog display system, a digital linearity corrector comprising:

a. analog display means for displaying analog signals;

b. binary circuit means for generating binary coordinate data representing analog signals which are to be displayed by said analog display means;

c. binary correction means coupled to said binary circuit means for generating a binary linearity correction factor as a function of the binary coordinate data; and d. binary-to-analog conversion means coupling said binary circuit means and said binary correction means to said analog display means for converting the binary coordinate data and the binary linearity correction factor to corrected analog deflection signals for said analog display means thereby producing an undistorted linear display.

2. The digital linearity corrector of claim 1 wherein said binary correction means is comprised of means for generating the sum of the squares of said binary coordinate data to provide the binary linearity correction factor as a function of said binary coordinate data.

3. The digital linearity corrector of claim 1 wherein said binary circuit means produces binary X- and Y-coordinate coordinate data.

4. The digital linearity corrector of claim 1 wherein the analog display means is coupled to said conversion means by amplifier means for increasing the strength of said corrected analog deflection signals transmitted to said analog display means.

5. The digital linearity corrector of claim 1 wherein said analog display means includes analog deflection means for deflecting a display on said analog display means in accordance with said corrected analog deflection signals.

6. The digital linearity corrector of claim 5 including compensation means for compensating for any distortion created by said analog deflection means.

7. The digital linearity corrector of claim 1 wherein said analog display means is comprised of:

an electron beam cathode-ray tube; and analog deflection means for deflecting the electron beam across the face of said tube in accordance with said corrected analog deflection signals thereby producing an undistorted linear display on the face of said tube.

8. The digital linearity corrector of claim 3 wherein said binary correction means is comprised of:

squarer means for digitally separately squaring the X- and the Y-coordinate data;

adder means for digitally summing the squares of the X- and Y-coordinate data; and control means for routing the flow of digital information through the system.

9. The digital linearity corrector of claim 9 wherein said control means is comprised of:

counter means for sequentially routing the flow of digital information through the system; and clock means for periodically operating said counter means.

10. The digital linearity corrector of claim 7 including means for correcting the focus of the electron beam on the face of the cathode-ray tube coupled between the conversion means and said cathode-ray tube.

* * * * *

UNITED STATES PATENT OFFICE

CERTIFICATE OF CORRECTION

Patent No. 3,648,097 Dated March 7, 1972

Inventor(s) JERRY DALE MERRYMAN

It is certified that error appears in the above-identified patent and that said Letters Patent are hereby corrected as shown below:

In Claim 9, Line 1, "claim 9" should read --claim 8--.

Signed and sealed this 4th day of July 1972.

(SEAL)
Attest:

EDWARD M.FLETCHER, JR.
Attesting Officer

ROBERT GOTTSCHALK
Commissioner of Patents